United States Patent [19]

Anderson

[11] 4,424,253

[45] Jan. 3, 1984

[54] LAMINATED SHEET STRUCTURES

[75] Inventor: Bernard F. Anderson, West Chester, Pa.

[73] Assignee: E. I. Du Pont de Nemours & Co., Wilmington, Del.

[21] Appl. No.: 350,841

[22] Filed: Feb. 25, 1982

Related U.S. Application Data

[63] Continuation-in-part of Ser. No. 252,883, Apr. 10, 1981, abandoned.

[51] Int. Cl.³ .................... B32B 27/08; B32B 27/32
[52] U.S. Cl. ................................. 428/215; 428/516; 428/517; 428/519; 428/521; 428/522; 156/308.2
[58] Field of Search ............... 428/519, 522, 521, 516, 428/517, 520, 215; 156/308.2

[56] References Cited

U.S. PATENT DOCUMENTS 2,925,354  2/1960  Berardinelli et al. ............... 428/516
4,115,614  9/1978  Martin ................................. 428/519

*Primary Examiner*—Marion McCamish
*Assistant Examiner*—E. Rollins Buffalow

[57] ABSTRACT

Blends of chlorinated hydrocarbon rubber selected from chlorosulfonated polyethylene having about 22-28 weight % Cl and 0.4-1.2 weight % S and chlorinated polyethylene having about 22-28 weight % Cl with EPM or EPDM elastomers in a proportion of 75-93% of the former and 7-25% of the latter can be compounded with usual fillers, pigments, stabilizers, and processing aids and formed into sheets which form hot bonded laminate structures with linear ethylene polymer sheets. Such laminate structures have very good adhesion peel strength, good mechanical strength and stretchability and are particularly useful in making pool and pond liners.

18 Claims, No Drawings

LAMINATED SHEET STRUCTURES

CROSS REFERENCE TO RELATED APPLICATION

This is a continuation-in-part of my application Ser. No. 252,883 filed Apr. 10, 1981 now abandoned.

BACKGROUND OF THE INVENTION

This invention is directed to composite structures comprising sheets of a chlorinated hydrocarbon elastomer composition laminated to sheets of linear polyethylene or linear copolymers of ethylene with α-olefins.

Chlorinated hydrocarbon elastomers such as chlorosulfonated polyethylene and chlorinated polyethylene have gained wide use in certain specialized applications where water, ozone, oxygen, and weather resistance and resistance to chemicals are important. Elastomeric chlorosulfonated polyethylene is available from E. I. du Pont de Nemours and Company, Wilmington, Del., while chlorinated polyethylene is available from Dow Corporation, Midland, Mich. The materials are used among others, in the manufacture of pool and pond liners as well as in roofing applications. In order to increase the mechanical strength and intregrity of large sheets of chlorinated hydrocarbon elastomers, it has been customary to bond them to a mechanically strong substrate, for example, a fabric woven from inorganic or organic fibers. While such bonded structures are very useful in many applications, they are deficient in not having sufficient elasticity to stretch without breakage under strain, for example, when needed to conform to the contour of a pond bottom. It would be preferable to bond or laminate such elastomers to an inexpensive but strong plastic sheet capable of stretching without rupture, for example, a polyethylene sheet. Unfortunately, neither chlorosulfonated polyethylene sheets nor chlorinated polyethylene sheets form with ethylene polymer sheets hot-bonded laminates having good peel strength, say, above 2 kN/m.

It is known to bond a sheet of chlorosulfonated polyethylene to a sheet of polyethylene using intermediate layers of a felted material comprised of polyethylene fibrils and chlorosulfonated polyethylene fibrils, as described in U.S. Pat. No. 3,026,229 to Wilcox. In addition to the fact that the method of U.S. Pat. No. 3,026,229 is quite cumbersome in that it requires the preparation of two waterleaves having different fibril compositions, it produces laminates having low peel strength (4.5 psi or about 0.8 kN/m, as shown in Example 2). It also is known to apply a chlorosulfonated polyethylene coating to polyethylene substrate. Chlorosulfonated polyethylene first is blended with polyethylene or with cyclized rubber; the mixture is then dissolved or dispersed in a suitable organic liquid and coated or sprayed onto a polyethylene sheet. The liquid is allowed to evaporate, leaving behind a well-adhering polymer coating; see U.S. Pat. Nos. 2,925,354 to Berardinelli et al. and 2,854,425 to Boger et al. Coating various substrates with a solution of chlorinated polyethylene is described in Canadian Pat. No. 903,021 to Ogawa et al. The drawback of these methods is that they can produce at most a thin coating and are not capable under practical operating conditions to provide a coating several hundredths of mm thick.

It thus is very desirable to provide a composite structure having high peel strength which would not suffer from the above shortcomings, yet would combine the chemical and environmental resistance of chlorosulfonated or chlorinated polyethylene with the mechanical strength of ethylene polymers.

SUMMARY OF THE INVENTION

According to the present invention, there is provided a laminate sheet structure comprising hot-bonded alternate plies of a linear polymer of ethylene containing 0 to about 10 weight percent of a $C_3$–$C_8$ α-olefin comonomer and of a composition consisting essentially of a blend of about 75–93 weight % of a chlorinated hydrocarbon elastomer selected from the group consisting of chlorosulfonated polyethylene containing about 22–28% Cl and 0.4–1.2% S and chlorinated polyethylene containing about 22–28% Cl with 7–25 weight % of an ethylene/propylene copolymer elastomer.

Alternatively, there is provided in a process for hot bonding a sheet of a composition consisting essentially of chlorosulfonated polyethylene or chlorinated polyethylene to a sheet of ethylene polymer, to form a laminate, the improvement of using a sheet of linear ethylene polymer containing 0 to about 10 weight percent of a $C_3$–$C_8$ α-olefin comonomer and a sheet of a composition consisting essentially of a blend of chlorosulfonated polyethylene containing about 22–28% Cl and 0.4–1.2% S with an ethylene/propylene copolymer elastomer, the respective proportions of the blend components being about 75–93 weight % of the former and 7–25 weight % of the latter.

Definition: The term "consisting essentially of" means that, in addition to the specifically recited components, the composition may contain other components, so long as they do not prevent the benefits of the invention from being realized.

DETAILED DESCRIPTION OF THE INVENTION

The laminated sheet structures of the present invention may be of the two-ply type or three-ply type or, in fact, may contain any number of plies. The most common structure, which would have virtually unlimited applications, would have three plies, that is, a center sheet of linear ethylene polymer and outer sheets of chlorinated hydrocarbon elastomer-ethylene/propylene copolymer elastomer blend. While it is possible and theoretically less expensive to make two-ply laminates, these are considered less desirable for two reasons; first, where it is important to install the laminate the right side up (normally, the chlorinated hydrocarbon elastomer side), an inexperienced or careless installer could expose the wrong side; second, at the lamination temperature the surfaces of the polyethylene sheet fuse, and the surface in contact with the laminating equipment (for example, rollers or press) would tend to stick to the equipment. Naturally, this could be avoided by protecting the equipment surfaces in contact with the ethylene polymer sheet with a nonstick finish or coating, for example, a polytetrafluoroethylene finish.

It has been found that both chlorosulfonated polyethylene and chlorinated polyethylene containing an amount of chlorine substantially outside the above-recited range of 22–28% do not provide laminates having satisfactory peel strength.

The ethylene/propylene copolymer component of the blend can be any ethylene/propylene dipolymer or ethylene/propylene/diene terpolymer or tetrapolymer.

Such dipolymers are known as EPM elastomers, while terpolymers and tetrapolymers are known as EPDM elastomers; the EPM and EPDM designation are accepted terms, wherein M stands for a rubber having a saturated chain of polymethylene type (see, for example, ASTM designation D-1418-72a); and several types of EPM and EPDM elastomers are known or are commercially available. EPDM elastomers are copolymers of ethylene with propylene and with a nonconjugated diene having one reactive double bond. They may, in addition, contain a minor amount of a second diene, which may have two reactive double bonds. The diene of the first type may be, for example, 1,4-hexadiene, 2-methyl-1,5-hexadiene; 1,9-octadecadiene, dicyclopentadiene, tricyclopentadiene, 5-ethylidene-2-norbornene, and 5-methylene-2-norbornene. The diene of the second type may be, for example, 1,4-pentadiene, 1,5-hexadiene, 1,7-octadiene, 1,20-heneicosadiene, 5-(5-hexenyl)-2-norbornene, 2,5-norbornadiene, 5-(2-propenyl)-2-norbornene, and the so-called "norborneonorbornene" obtained by reaction of cyclopentadiene with norbornadiene-2,5. EPDM elastomers of both terpolymer and tetrapolymer type can be obtained from E. I. du Pont de Nemours and Company, Wilmington, Del., U.S.A. Most commercial EPDM elastomers contain about 50–75 weight % of ethylene and 1–6 weight % of diene or dienes, the remainder being propylene. Such elastomers are suitable in the structures and the method of this invention. Those monomer proportions, however, are not considered critical. Ethylene/propylene dipolymers are available, among others, from EXXON, Copolymer Corporation, B. F. Goodrich, and Uniroyal. Both EPDM and EPM elastomers can be made according to the techniques described in a review article by F. P. Baldwin et al. in Rubber Chemistry and Technology, Vol. 45, pp 709–881 (1972) The preferred amount of ethylene/propylene copolymer elastomer is 10–20% by weight of the blend.

The chlorinated hydrocarbon elastomer-ethylene/propylene copolymer elastomer blend normally will be further compounded, for example, with pigments, fillers, stabilizers and processing aids. Usual fillers, which are added to increase modulus, block light, and reduce cost, include, for example, carbon black, whiting, and clay. Basic metal oxides such as zinc and magnesium oxides as well as epoxy resins can be added as HCl-absorbing stabilizers. Processing aids such as, for example, stearamide and poly(ethylene oxide) improve calendering and prevent blocking of rolled or folded sheet. The chlorinated hydrocarbon elastomers compounded with all those additives may be difficult to process. This is especially true of chlorinated polyethylene. It is, therefore, practical to add a high-molecular weight plasticizer, such as for example an ethylene/vinyl acetate copolymer, to improve the processability of the compound. Low molecular weight plasticizers and processing oils, when used alone, lower the mechanical strength of the chlorinated hydrocarbon elastomers and may interfere with the ability of such elastomers to adhere to ethylene polymer substrate. The amount of high molecular weight plasticizer may be up to about 10%, and the total amount of all additives may be up to about 150%, based on the weight of the chlorinated hydrocarbon elastomer-ethylene/propylene copolymer elastomer blend.

When the amount of ethylene/propylene copolymer is within the required range, sheets made of such blends can be hot-bonded to linear ethylene polymer sheets to give laminates having high mechanical strength and stretchability and high peel strength. Such laminates can stretch as much as 300%, for example, to fill a sink hole in a pond under drastic conditions.

Linear polymers of ethylene include both homopolymer and copolymers of ethylene with other α-olefins. The homopolymer is known as high density polyethylene (density of about 0.940–0.980 g/mL) and can be obtained from several suppliers, including E. I. du Pont de Nemours and Company and Union Carbide Corporation. Other α-olefins, which may be present as comonomers in linear ethylene polymers, include, for example, propylene, 1-butene, isobutylene, 1-pentene, 1-hexene, 1-heptene, and 1-octene. Some of these copolymers are available commercially; for example, a copolymer with 1-octene from Dow Corporation, a copolymer with 1-hexene from Phillips Petroleum Co., and a copolymer with 1-butene from Du Pont Canada Inc. All linear polymers are made by polymerization or copolymerization in the presence of a coordination type catalyst, as is well known to the art. Copolymerization of ethylene with $C_3$–$C_{18}$ α-olefins is described in U.S. Pat. No. 4,076,698 to Anderson et al.

For most applications, the chlorinated hydrocarbon elastomer-ethylene/propylene copolymer elastomer composition sheets are about 0.25–0.5 mm thick, while the ethylene polymer sheets are about 0.1–0.25 mm thick. Lamination is accomplished by hot bonding, rather than by adhesive bonding, using standard equipment, such as a hot-roll calender, a rotary press, a heated hydraulic press, or sets of laminating rolls.

Obviously, this invention is not limited to laminates in which all chlorinated hydrocarbon elastomer sheets and/or all ethylene polymer sheets are identical. It is possible and may be desirable in a multilayer laminate to vary either the chemical composition or the thickness of the sheets, as may seem appropriate.

This invention is now illustrated by representative examples of certain preferred embodiments thereof, where all parts, proportions, and percentages are by weight. All data obtained in units other than SI have been converted to SI units.

EXAMPLES 1–5

The ingredients listed in the table below were mixed in an internal mixer starting at ambient temperature for about five minutes until the temperature reached 138° C. The mixture was removed from the mixer and formed into 0.28 mm thick sheets on a calender or a two-roll mill. These sheets were laminated to both sides of a 0.1 mm thick sheet of high density polyethylene by passing all three sheets through a three-roll calender with the second and third rolls heated to 149° C. These laminates were used for the determination of elongation at break and tear strength. For adhesion tests, a 1.59 mm thick sheet of chlorosulfonated polyethylene-ethylene/propylene copolymer elastomer composition was laminated in a hydraulic press heated at 138° C. to a 1.59 mm thick high density polyethylene sheet in a 3.2 mm thick frame. Laminates of such high thickness are considered to be impractical for most applications.

The peel adhesion, elongation at break and tear strength of these laminated structures are given in the following Table I. It can be seen that the peel adhesion is very good and reaches in Example 1 a very high level of more than 12.1 kN/m. Both the elongation at break and tongue tear data also are very good.

TABLE I

| Ingredients | Example 1 | Example 2 | Example 3 | Example 4 | Example 5 |
|---|---|---|---|---|---|
| Chlorosulfonated Polyethylene (25% Cl, 0.9% S) | 100 | 100 | 100 | 100 | 100 |
| EPDM 1[a] | 24 | 12 | — | — | — |
| EPDM 2[b] | — | — | 24 | — | — |
| EPDM 3[c] | — | — | — | 24 | — |
| EPM[d] | — | — | — | — | 24 |
| Dibasic lead phthalate | 10 | 10 | 10 | 10 | 10 |
| Carbon black (MT, N-990) | — | — | — | — | 100 |
| Carbon black (SRF, N-762) | 50 | 50 | 50 | 50 | — |
| Whiting (CaCO$_3$) | 40 | 40 | 40 | 40 | — |
| Clay (SUPREX)[e] | 10 | 10 | 10 | 10 | — |
| Antioxidant[f] | — | — | — | — | 1 |
| Epoxy resin | 5 | 5 | 5 | 5 | 5 |
| Stearamide | 0.6 | 0.6 | 0.6 | 0.6 | 0.6 |
| Poly(ethylene oxide) 4000 | 1 | 1 | 1 | 1 | 1 |
| Properties of laminate | | | | | |
| Peel adhesion (ASTM D413) kN/m | 12.1 | 4.4 | 4.4 | 4.4 | 8.2 |
| Elongation at Break (%) (ASTM D-882 8 cm/min) | 420 | 480 | | | |
| Tongue Tear N (ASTM D-751) | 129 | 89 | | | |

[a] semicrystalline terpolymer containing 1,4-hexadiene; M$_L$ at 121° C. = 50
[b] amorphous terpolymer containing 1,4-hexadiene; M$_L$ at 121° C. = 40
[c] semicrystalline polymer containing 5-ethylidene-2-norbornene; M$_L$ at 121° C. = 75
[d] amorphous dipolymer containing 68% of ethylene and 32% of propylene; melt index at 121° C. = 27 g/10 min.
[e] Carolina hard clay of J. M. Huber Co.
[f] "Irganox" 1010, Ciba-Geigy Corp.

EXAMPLE 6

A 1.59 mm thick sheet of a composition similar to that of Example 1, except that the amount of dibasic lead phthalate was reduced to 4 parts, was hot pressed under the conditions of Examples 1–5, above, against a 1.59 mm sheet of a linear copolymer of ethylene with 1-butene containing 5 weight percent of the 1-butene comonomer.

The peel adhesion strength of this sample was 4.7 kN/m.

COMPARATIVE EXAMPLES A–E

A. A composition was prepared as in Example 1, except that no EPDM elastomer was added. A sheet made of this composition was laminated to a sheet of high density polyethylene as in Example 1. The peel adhesion value was only 2.1 kN/m.

B. A composition was prepared as in Example 1, except that the amount of EPDM elastomer was reduced to 5% of the total weight of chlorosulfonated polyethylene plus EPDM elastomer. The peel adhesion of a laminate of a sheet of this composition with a high density polyethylene sheet was only 1.57 kN/m.

C. A composition was prepared as in Example 1, except that chlorosulfonated polyethylene having 35% chlorine was used. A laminated structure made of a sheet of this composition with a sheet of high density polyethylene had a peel adhesion of only 1.6 kN/m.

D. A composition was prepared as in Example 1, except that high density polyethylene was substituted for EPDM elastomer. The peel adhesion of a laminated structure made of a sheet of this composition and a sheet of high density polyethylene was only 1.4 kN/m.

E. A composition was prepared as in Example 2 and formed into a sheet which was laminated to a sheet of branched polyethylene. The peel adhesion value of this laminate was only 1.7 kN/m.

EXAMPLE 7 AND COMPARATIVE EXAMPLE F

Laminates were prepared for peel adhesion tests according to the technique of Examples 1–5 using the compositions shown in the following Table II. The test data are given in the Table.

TABLE II

| Ingredients | Example 7 | Comparative Example F |
|---|---|---|
| Chlorinated Polyethylene (25% Cl) | 100 | 100 |
| EPDM 1(see Table I footnote a) | 25 | — |
| Dibasic lead phthalate | 5 | 4 |
| Carbon black (SRF, N-762) | 125 | 100 |
| Ethylene/vinyl acetate copolymer[1] | 12.5 | 10 |
| Antioxidant[2] | 0.25 | 0.2 |
| Stearamide | 0.75 | 0.6 |
| Poly(ethylene oxide) 4000 | 1.25 | 1 |
| Peel adhesion (ASTM D413) kN/m | 7 | 0.9 |

[1] 90% ethylene, 10% vinyl acetate; melt index 8 g/10 min.
[2] Polymerized 2,2,4-trimethyl-1,2-dihydroquinoline ("Agerite" Resin D, Vanderbilt)

I claim:

1. A laminate sheet structure comprising hot bonded alternate plies of a linear polymer of ethylene containing 0 to about 10 weight percent of a C$_3$–C$_8$ α-olefin comonomer and of a composition consisting essentially of a blend of about 75–93 weight % of a chlorinated hydrocarbon elastomer selected from the group consisting of chlorosulfonated polyethylene containing about 22–28% Cl and 0.4–1.2% S and chlorinated polyethylene containing about 22–28% Cl with 7–25 weight % of an ethylene/propylene copolymer elastomer the plies that consist essentially of the blend being at least about 0.25 mm thick.

2. A laminate structure of claim 1 wherein the composition consisting essentially of a blend of a chlorinated hydrocarbon elastomer with an ethylene/propylene copolymer elastomer also comprises additives selected from fillers, stabilizers, and processing aids, the total amount of all additives, including any pigments present, being up to about 150% based on the weight of the chlorinated hydrocarbon elastomer-ethylene/propylene copolymer elastomer blend.

3. A laminate structure of claim 2 wherein the chlorinated hydrocarbon elastomer is chlorosulfonated polyethylene.

4. A laminate structure of claim 3 wherein the composition contains an epoxy resin.

5. A laminate structure of claim 2 wherein the chlorinated hydrocarbon elastomer is chlorinated polyethylene.

6. A laminate structure of claim 5 wherein an ethylene/vinyl acetate copolymer serves as processing aid and is present in an amount of up to about 10% based on the weight of the chlorinated hydrocarbon elastomer-ethylene/propylene copolymer elastomer blend.

7. A laminate structure of claim 2 consisting of one ply of linear polymer of ethylene and one ply of a composition consisting essentially of a blend of a chlorinated hydrocarbon elastomer with an ethylene/propylene copolymer elastomer.

8. A laminate structure of claim 2 consisting of a core ply of linear polymer of ethylene and of two outer plies of a composition consisting essentially of a blend of a chlorinated hydrocarbon elastomer with an ethylene/propylene copolymer elastomer.

9. A laminate of claim 7 or 8 wherein the linear polymer of ethylene is polyethylene.

10. A laminate structure of claim 7 or 8, wherein the ethylene/propylene elastomer is an EPDM elastomer which contains about 50–75 weight % of ethylene and 1–6 weight % of diene, the remainder being propylene.

11. A laminate of claim 10, wherein the amount of EPDM elastomer is 10–20 weight % of the blend with chlorinated hydrocarbon elastomer.

12. A laminate structure of claim 7 or 8 wherein the ethylene/propylene copolymer elastomer is an ethylene/propylene dipolymer.

13. A laminate structure of claim 7, wherein the core ply is about 0.1–0.25 mm thick, and the outer plies are about 0.25–0.5 mm thick.

14. In a process for hot bonding a sheet of a composition consisting essentially of a chlorinated hydrocarbon elastomer to a sheet of a polymer of ethylene, to form a laminate,
the improvement of using a sheet of a linear polymer of ethylene containing 0 to about 10 weight percent of a $C_3$–$C_8$ α-olefin comonomer and a sheet having a thickness of at least about 0.25 mm of a composition consisting essentially of a blend of a chlorinated hydrocarbon elastomer selected from the group consisting of chlorosulfonated polyethylene containing about 22–28% Cl and 0.4–1.2% S and chlorinated polyethylene containing about 22–28% Cl with an ethylene/propylene copolymer elastomer, the respective proportions of the blend components being about 75–93 weight % of the former and 7–25 weight % of the latter.

15. A method of claim 14 wherein the composition consisting essentially of a blend of a chlorinated hydrocarbon elastomer with an ethylene/propylene elastomer also comprises additives selected from fillers, stabilizers, and processing aids, the total amount of all additives, including any pigments present, being up to about 150% based on the weight of the chlorinated hydrocarbon elastomer-ethylene/propylene copolymer elastomer blend.

16. A method of claim 15 wherein the amount of ethylene/propylene copolymer elastomer in the blend is about 10–20 weight %.

17. A method of claim 15 wherein the ethylene/propylene copolymer is an EPDM elastomer which contains about 50–75 weight % of ethylene and 1–6 weight % of diene, the remainder being propylene.

18. A method of claim 14 wherein the chlorinated hydrocarbon elastomer is chlorosulfonated polyethylene; the ethylene/propylene copolymer elastomer is an EPDM elastomer; and the polymer of ethylene is polyethylene.

* * * * *